No. 857,223. PATENTED JUNE 18, 1907.
S. BARBER.
NUT LOCK.
APPLICATION FILED SEPT. 15, 1906.
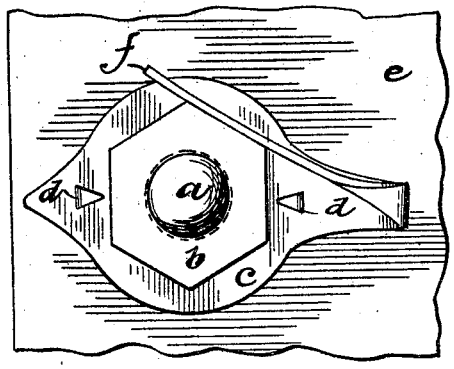
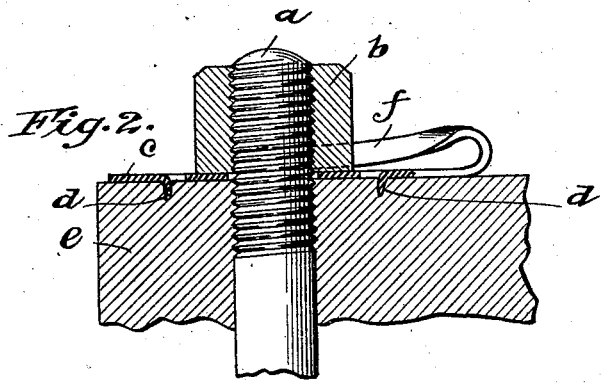

UNITED STATES PATENT OFFICE.

SHERMAN BARBER, OF CHICAGO, ILLINOIS.

NUT-LOCK.

No. 857,223.  Specification of Letters Patent.  Patented June 18, 1907.

Application filed September 15, 1906. Serial No. 334,763.

*To all whom it may concern:*

Be it known that I, SHERMAN BARBER, a citizen of the United States, residing at Chicago, in the county of Cook and State of Illinois, have invented a new and useful Nut-Lock, of which the following is a specification.

My invention relates to improvements in nutlocks in which an arm forming a projection of a nonturnable washer extends along the side of the nut and by the strength of the material composing the arm, prevents loosening of the nut in service; the object being to permit turning of the nut by means of a wrench or other similarly applied power without removing the locking feature of the device, yet preventing the loosening of the nut through the vibrations of ordinary service. I attain those objects by means of the device shown in the accompanying drawing in which Figure 1 is a plan view, Fig. 2 is a cross-section of same, In the drawings, *e* indicates the base, and *a* is the bolt.

*b* indicates the nut.

The reference character *c* indicates my washer, constituting the particularly novel feature of my invention. This washer is essentially an apertured expanded plate having a narrow arm *f* formed as an integral tongue thereon, and bent upward and backward to engage with the side of the nut above the washer. As shown, the arm is first bent on a generally horizontal axis, which is transverse to the length of the arm, and thence extended more or less horizontally rearward over the washer plate; and preferably the reduced arm is carried some distance out from the body of the washer before bending backward as described.

The arm *f* is twisted on a longitudinal axis after receiving its horizontal bend, the result being to present the flat face of the outer portion of the arm to the side of the nut.

It will be noted that the arm is extended outward from the washer in a direction that is substantially radial with respect to the bolt hole therein. This requires that the upper portion of the arm be flexed considerably to one side, in order to bear against the lateral face of the nut, a feature which contributes materially to a secure locking of the nut. In order to secure this washer against rotation, it may be provided with down-struck spurs *d*.

What I claim is:

1. A lock-nut washer consisting of an expanded apertured plate having a reduced arm extended for a considerable distance outward in substantially a horizontal plane, then bent upward and backward over the plate on a substantially horizontal axis transverse to the length of the arm, and beyond said bend twisted on a longitudinal axis to position its nut-engaging portion in a substantially vertical plane.

2. A lock nut washer, consisting of an apertured plate having a reduced arm extended outward for a considerable distance in a substantially horizontal plane and in a direction substantially radial with reference to the bolt hole in the washer, then bent upward and backward over itself on a substantially horizontal axis transverse to its length, and beyond such bend twisted on a longitudinal axis to position its nut-engaging portion in a substantially vertical plane.

SHERMAN BARBER.

Witnesses:
GEO. F. ORT,
EDWARD G. STOCKERT.